United States Patent
Hofmann et al.

(10) Patent No.: US 6,911,797 B2
(45) Date of Patent: Jun. 28, 2005

(54) MULTI-AXES INDUSTRIAL PROCESSING MACHINE

(75) Inventors: Tobias Hofmann, Forchheim (DE); Sebastian Raith, Erlangen (DE); Bernd Segger, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/631,498

(22) Filed: Jul. 31, 2003

(65) Prior Publication Data

US 2004/0066167 A1 Apr. 8, 2004

(30) Foreign Application Priority Data

Jul. 31, 2002 (DE) .......................................... 102 35 052

(51) Int. Cl.⁷ ...................... G05B 19/23; G05B 19/33; H03H 7/00; H01F 17/00
(52) U.S. Cl. ...................... 318/575; 318/574; 333/177; 333/181; 323/355; 323/364
(58) Field of Search ................................ 323/364, 355; 318/574, 575, 625, 663, 654, 656–58; 333/12, 181, 177, 32; 336/5

(56) References Cited

U.S. PATENT DOCUMENTS

| | | | | |
|---|---|---|---|---|
| 4,422,056 A | * | 12/1983 | Roberts | .................... 333/177 |
| 5,023,537 A | * | 6/1991 | Baits | .......................... 318/732 |
| 5,023,768 A | * | 6/1991 | Collier | ........................ 363/68 |
| 5,341,281 A | * | 8/1994 | Skibinski | ...................... 363/39 |
| 5,990,654 A | * | 11/1999 | Skibinski et al. | ........... 318/800 |
| 6,288,915 B1 | * | 9/2001 | Stemmler et al. | ............. 363/34 |
| 6,483,279 B1 | * | 11/2002 | Poss et al. | .................. 323/250 |
| 6,504,464 B2 | * | 1/2003 | Komiya | ...................... 336/174 |
| 6,580,248 B2 | * | 6/2003 | Raith et al. | ................. 318/702 |
| 6,583,598 B2 | * | 6/2003 | Raith et al. | ................. 318/702 |

FOREIGN PATENT DOCUMENTS

| | | |
|---|---|---|
| DE | 100 59 332 A1 | 6/2002 |
| DE | 100 59 334 A1 | 6/2002 |

* cited by examiner

*Primary Examiner*—David Martin
*Assistant Examiner*—Patrick Miller
(74) *Attorney, Agent, or Firm*—Henry M. Feiereisen (57) ABSTRACT

A multi-axes industrial processing machine with a multi-axes electrical drive system and at least two axle drives that have each an axle module and a built-in motor is disclosed. The machine further includes an impedance that is transformer-coupled with a supply module through an annular core. Either the phase lines on the AC side of the supply module or the output lines of the DC side of the supply module as well as an additional winding are wound on the annular core. The impedance is connected in parallel to the additional winding.

16 Claims, 6 Drawing Sheets

FIG 1

PRIOR ART

MULTI-AXES INDUSTRIAL PROCESSING MACHINE

CROSS-REFERENCES TO RELATED APPLICATIONS

This application claims the priority of German Patent Application, Serial No. 102 35 052.3, filed Jul. 31, 2002, pursuant to 35 U.S.C. 119(a)–(d), the disclosure of which is incorporated herein by reference.

BACKGROUND OF THE INVENTION

The present invention relates to a multi-axes industrial processing machine, and more particularly to an industrial processing machine with multi-axle electrical drive systems that include built-in motors controlled by a centrally regulated supply module.

Multi-axes industrial processing machines include, among others, machine tools and production machines. Conventional in machine tools are, for example, lathes, milling machines, drills or winding machines. Machine tools also include central processing facilities, linear and rotary transfer machines, laser machines and/or rolling and gear cutting machines. These machines have in common that a material can be machined along multiple axes. Production machines can be used to process textiles, plastics, wood, glass, ceramics or rocks. Production machines can be employed in metalworking and/or packaging, printing and materials-handling.

Modern industrial processing machines are constructed with built-in motors, in particular linear motors and torque motors, eliminating mechanical components, such as gears, drive belts, and spindles. This reduces the size of industrial processing machines and increases productivity. A compact design can be achieved with built-in motors, because they can be better integrated in the mechanical configuration of the industrial processing machine than conventional motors. The electric motor together with the surrounding mechanical configuration forms a mechatronic unit.

However, in the event of a malfunction, built-in motors are difficult to access and hence more difficult to exchange. This makes the installation more expensive and can cause long machine downtimes. Built-in motors therefore must operate reliably over a long time.

A processing machine of this type includes a multi-axes converter system that drive several built-in motors of the multi-axes industrial processing machine. The converter system in conjunction with the motors form of the multi-axle drive system. The multi-axes converter system is housed in a switchbox of the industrial processing machine and includes a centrally controlled supply module with a smoothing choke on the AC side and several axes modules. These modules are electrically connected on the DC side via a DC intermediate circuit. On the AC side, each axle module is electrically connected with a built-in motor, forming an axis drive. It is hereby inconsequential if the axle module and the associated built-in motor are implemented as separate units or not. The axle modules can be implemented as multi-phase free-running pulse converters using Insulated-Gate-Bipolar-Transistors (IGBT).

The centrally arranged regulated supply module with the smoothing choke on the AC side generates from a multiphase line voltage a constant regulated DC voltage with an amplitude that is greater than the DC value of the line voltage on the input side. To generate this regulated DC voltage, the supply module cooperates with the smoothing choke to form a voltage up-converter. The centrally arranged regulated supply module together with the smoothing choke on the AC side forms a regulatable DC source.

In addition to these elements of the multi-axes converter system, parasitic capacitances to ground have to be taken into account. These so-called leakage capacitances form in conjunction with the inductance of the smoothing choke and the inductance of an additional line filter a weakly damped oscillator circuit. The switching processes of the central supply module as well as the switching processes in the various axes modules excite oscillations in the weakly damped oscillator circuit at its natural resonance frequency.

Due to resonance conditions, an objectionable resonance oscillation with an amplitude of up to several 100 V can be superimposed on the potentials of the DC intermediate circuit of the converter system. As a result, the intermediate circuit operates farther from its intrinsic symmetric rest position than when only the switching process of centrally arranged supply module is considered. The weak damping of the resonance circuit generates high peak voltages. An electric motor can thereby exhibit a frequency characteristic with a pronounced resonance overshoot against ground. This overshoot occurs in the region of the star point of the motor which is typically incapable of withstanding excessive voltages. If the system converter system oscillates close to a motor resonance frequency, then the isolation to ground, in particular at the star point, of each electrical machine of the multi-axle drive system can be overloaded and can cause a premature failure of individual motors of the multi-axle drive system, because the resonance can generate significantly higher voltages at the motor star point than at the motor terminals.

A premature failure of a motor of a multi-axes industrial processing machine with built-in motors could cause long machine downtimes and a significant loss in production due to the poor accessibility of the built-in motors.

German patent publication no. DE 100 59 334 A1 discloses measures for attenuating the afore-described resonance overshoots of an electric motor that is operated with a converter having a voltage intermediate circuit, by connecting an impedance between the star point of the motor and ground. This impedance, which advantageously includes a series connection of an ohmic resistor and a capacitance, attenuates the capacitive leakage currents to ground potential that are generated in the winding strands of the motor. This impedance is dimensioned so as to sustain the asymmetric leakage currents to ground caused by the system oscillations of the converter system produced by the motor phases.

A prerequisite for using these conventional measures is that the star point terminal of the motor is accessible from the outside, and the built-in motor leaves enough space for the impedance. In addition, this measure has to be applied to each motor of a multi-axle drive system.

German Patent publication no. DE 100 59 332 A1 discloses another measure for solving the afore-described problem. According to this measure, a magnetic core is provided, through which the phases of a motor are routed in common. This magnetic core has a winding, with an impedance connected in parallel with the winding, so that the impedance short-circuits the winding. This winding transformer-couples the impedance to all phases of a motor. Because all phases of a motor are routed through this magnetic core, only the interfering common-mode processes of the characteristic system oscillations of the converter system are attenuated.

This solution also requires that enough space is available for the transformer-coupling of the impedance to all phases of a motor in the drive system. The magnetic core with the short-circuited winding has to be placed between the output of an axle module and the terminal box of a corresponding motor. This measure also affects the damping of characteristic system oscillations of the converter system on a motor. In a multi-axle drive system magnetic, a number of cores with short-circuited windings that correspond to the number of axes have to be provided. This solution advantageously no longer requires the star point for the damping, which therefore no longer needs to be externally accessible.

German Patent publication no. DE 100 59 332 A1 discloses a motor for an industrial processing machine with an electric drive system, a supply module, a smoothing choke, an axis drive and an DC-equivalent source producing a DC voltage, wherein an impedance is transformer-coupled at the input of the motor, thereby preventing resonance overshoots excited by system oscillations.

It would therefore be desirable and advantageous to provide a multi-axes industrial processing machine, which obviates prior art shortcomings and is able to specifically dampen characteristic system oscillations for all axes in a cost-effective and space-saving manner.

SUMMARY OF THE INVENTION

According to one aspect of the present invention, a multi-axes industrial processing machine with a multi-axes electrical drive system includes a centrally controlled supply module having an AC side and a DC side, a smoothing choke connected to the AC side of the supply module, and at least two axle drives that have each an axle module and a built-in motor. The axle modules are electrically connected on the DC side of the supply module. The machine further includes an impedance which is coupled in a transformer configuration (in the following description referred to as "transformer-coupled") with the supply module through an annular core, whereby phase lines on the AC side of the supply module and an additional winding having each at least one turn are wound on the annular core. The impedance being connected in parallel to the additional winding.

According to another aspect of the invention, a multi-axes industrial processing machine with a multi-axes electrical drive system includes a centrally controlled supply module having an AC side and a DC side, a smoothing choke connected to the AC side of the supply module, and at least two axle drives that have each an axle module and a built-in motor, wherein the axle modules are electrically connected on the DC side of the supply module. The processing machine further includes an impedance transformer-coupled with the supply module through an annular core, whereby output lines of the DC side of the supply module and an additional winding having each at least one turn are wound on the annular core. The impedance is connected in parallel to the additional winding.

By coupling the impedance inductively with the supply module, a generated characteristic system oscillation is damped. i.e., essentially no undesirable oscillations occur in the DC voltage intermediate circuit of the multi-axle drive system, depending on the damping effect of the inductively coupled impedance. As a result, undesirable system oscillations also do not affect the individual drives which otherwise would overload the star points of the axle drives with an excess voltage.

It is inconsequential for the transformer-coupling of the impedance if the impedance is coupled on the input side or to the output side of the centrally arranged regulated supply module. By transformer-coupling of the impedance to the centrally regulated supply module, only one damping device is required for several axle drives of a multi-axle drive system. In addition, no additional production space is required aside from a portion of a service cabinet of the industrial processing machine, in which at least centrally regulated supply module with the AC-side smoothing choke is housed. Several axes modules can be housed inside the service cabinet.

According to an advantageous feature of the invention, the transformer-coupled impedance and the smoothing choke can be implemented as a single component. Moreover, built-in motor can be a torque motor, a linear motor and/or a motor spindle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
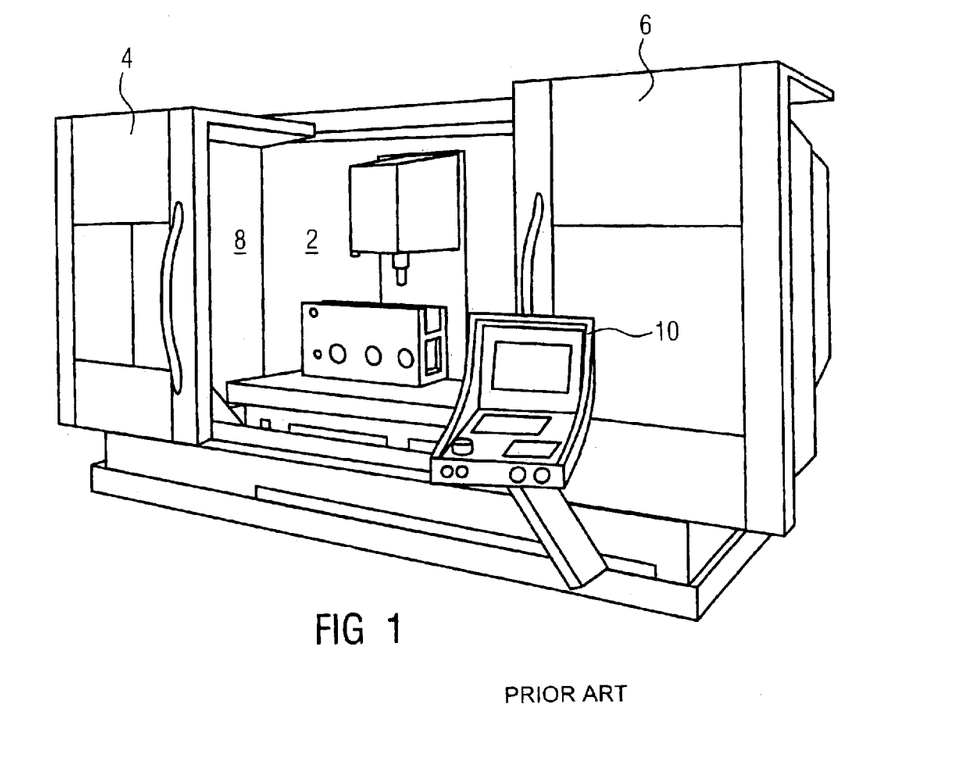
FIG. 1 is a schematic perspective view of a prior art multi-axes industrial processing machine.

Turning now to the drawing, and in particular to FIG. 1, there is shown an exemplary conventional multi-axes industrial processing machine, in particular a machine with a movable carriage driven by linear drives, e.g., a linear drive arranged along the x-axis. The working range is defined by three axes arranged in the production space 2 of the processing machine, which is enclosed by two sliding doors 4 and 6 to protect an operator. The axle drives can be activated only after the two sliding doors 4 and 6 have been closed. A control box is arranged on the side next to the production space 2 of the production machine. In this example, the control box 8 is located inside the processing machine. For larger processing machines, the control box 8 can also be located separate from the processing machine, provided the distance between the control box 8 and the processing machine is not too great. The industrial processing machine can also include an operating console 10 and a tool repository (not shown). The multi-axes converter system is located in the control box 8. The cabling between the operating console 10 and the control box 8 and the control box 8 and the motors, respectively, for example the built-in motors, can be located inside the processing machine. The processing machine can be built more compact by using built-in motors, in particular linear motors and/or torque motors, because mechanical coupling elements, such as gears, belts or spindles can thus be eliminated.

Figure 2:
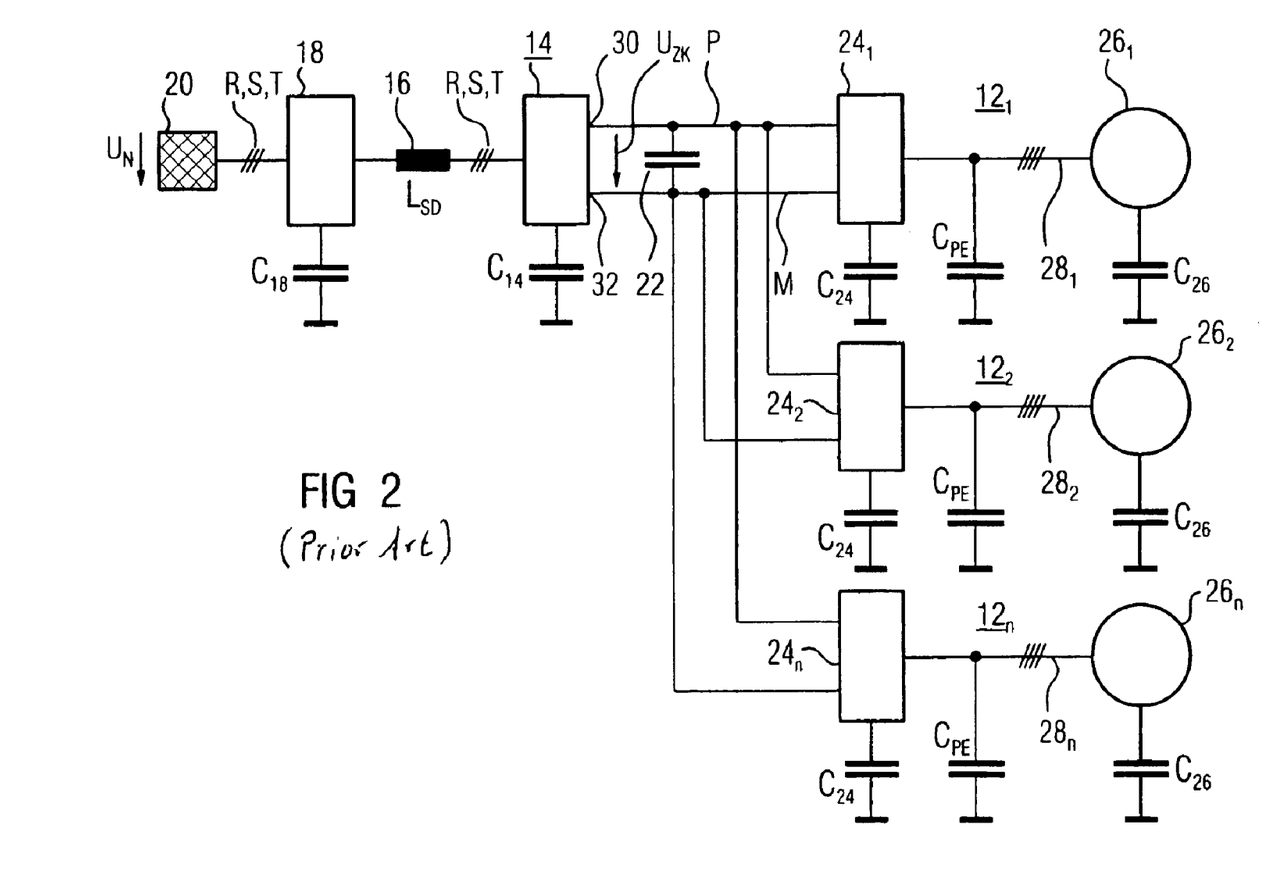
FIG. 2 is a schematic block diagram of a multi-axle drive system of the prior art multi-axes industrial processing machine of FIG. 1.

FIG. 2 shows a schematic block diagram of a multi-axle drive system of a multi-axes industrial processing machine, for example of the processing machine according to FIG. 1. The multi-axle drive system has several drives $12_1, 12_2, \ldots, 12_n$ and a centrally located regulated supply module 14. On the AC side, the supply module 14 is connected with a smoothing choke 16 which in turn is connected to a power grid 20 via a line filter 18. The power grid 20 is here a three-phase grid. On the DC side, the supply module 14 is electrically connected to a capacitor 22 which is also referred to as an intermediate circuit capacitor. The intermediate circuit capacitor 22 supports a generated DC voltage $U_{ZK}$ and decouples the axle drives $12_1, 12_2, \ldots, 12_n$ from the power grid 20. Each of the n axle drives $12_1, 12_2, \ldots, 12_n$ includes an axle module $24_1, 24_2, \ldots, 24_n$ and a motor $26_1, 26_2, \ldots, 26_n$, for example a built-in motor. Each axle module $24_1, 24_2, \ldots, 24_n$ is electrically connected via a dedicated four-conductor cable $28_1, 28_2, \ldots, 28_n$, in particular a shielded cable, with a corresponding built-in motor $26_1, 26_2, \ldots, 26_n$. The three phase conductors and a ground wire represent the four conductors of each shielded cable $28_1, 28_2, \ldots, 28_n$. Each ground wire connects a grounded housing of a built-in motor $26_1, 26_2, \ldots, 26_n$ with a grounded housing of an axle module $24_1, 24_2, \ldots, 24_n$. The DC sides of the axle modules $24_1, 24_2, \ldots, 24_n$ are each connected to a corresponding DC output 30 and 32 of the centrally arranged regulated supply module 14, with the intermediate circuit capacitor 22 connected in parallel with the outputs 30 and 32. The axle modules $24_1, 24_2, \ldots, 24_n$ can be implemented as free-wheeling multi-phase pulsed rectifiers which include controlled turn-off semiconductor switches as rectifier valves. The controlled turn-off semiconductor switches are preferably implemented as Insulated Gate Bipolar Transistors (IGBT).

The supply module 14 together with the AC side smoothing choke 16 and the DC side intermediate circuit capacitor 14 form a regulated DC source. The supply module 14 is implemented as a free-wheeling pulsed rectifier, with the current valves being implemented as controlled turn-off semiconductor switches. The network-side free-wheeling pulsed rectifier also uses IGBTs as controlled turn-off semiconductor switches. The network-side free-wheeling pulsed rectifier cooperates with the smoothing choke 16 to form a voltage up-converter. As a result, the amplitude of a regulated DC voltage $U_{ZK}$ generated at the output 30 and 32 of the supply module 14 is greater than the DC value of a power grid voltage $U_N$. The dynamics of the axle modules $24_1, 24_2, \ldots, 24_n$ increases with increasing intermediate circuit DC voltage $U_{ZK}$.

In addition to the aforedescribed components of a multi-axle drive system, parasitic capacitances against ground occur which are also referred to as leakage capacitances. For example, the line filter 18 has a leakage capacitance $C_{18}$, and the supply module 14, the axle modules $24_1, 24_2, \ldots, 24_n$ and the built-in motors $26_1, 26_2, \ldots, 26_n$ each have respective leakage capacitances $C_{14}$, $C_{24}$ and $C_{26}$ to ground. In addition, the shielded cables $28_1, 28_2, \ldots, 28_n$ have a capacitance $C_{PE}$ relative to the ground wire and the shielded cable has a capacitance with respect to the grounded shielded of the cable, which is not shown in detail. The leakage capacitances $C_{14}$, $C_{18}$, $C_{24}$, $C_{26}$ and $C_{PE}$ relative to ground together with the inductance $L_{SD}$ of the smoothing choke 16 form a weakly damped oscillator circuit with a natural resonance frequency $f_{sys}$. The weakly damped oscillator circuit is excited by each switching process of the supply module 14 and of each axle module $24_1, 24_2, \ldots, 24_n$. This weakly damped oscillator circuit causes the aforedescribed problem.

Figure 2A:
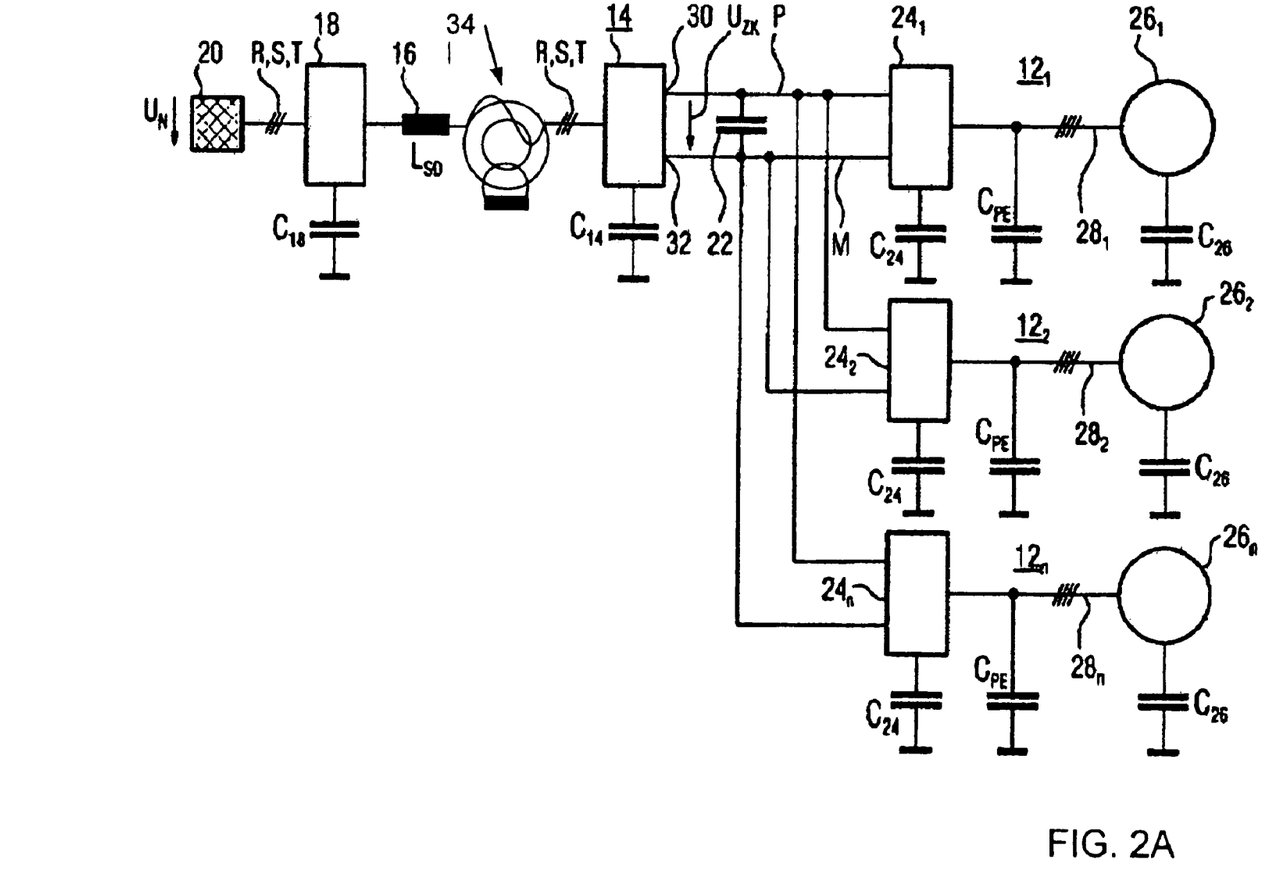
FIG. 2A is a schematic block diagram of a first embodiment of a multi-axle drive system of a multi-axes industrial processing machine according to the invention.
Figure 2B:
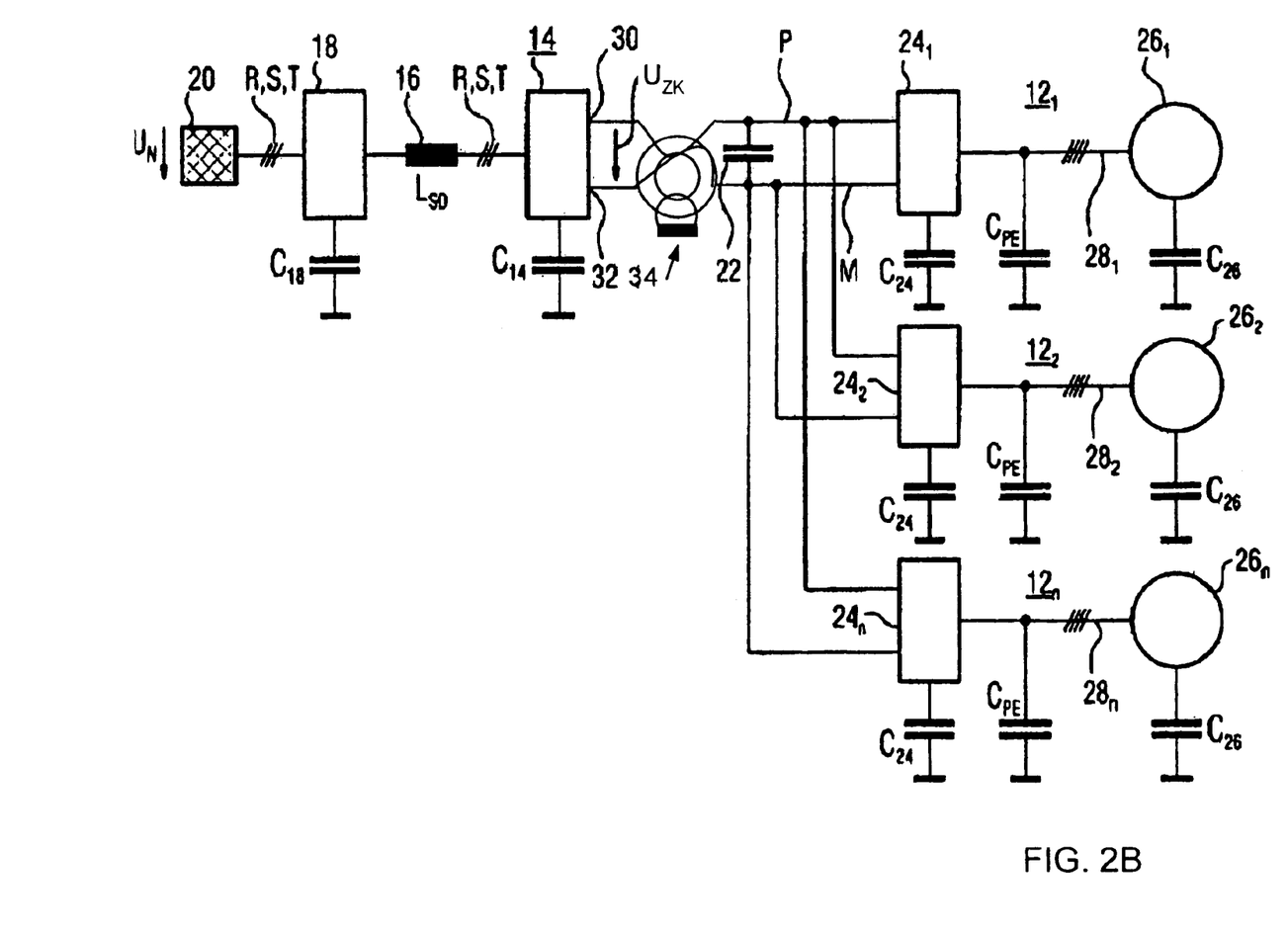
FIG. 2B is a schematic block diagram of a second embodiment of a multi-axle drive system of a multi-axes industrial processing machine according to the invention.

FIGS. 2A and 2B show each a schematic block diagram of a multi-axle drive system of a multi-axes industrial processing machine, which in addition includes a transformer impedance 34 that dampens the oscillations of the weakly damped oscillator and thereby eliminates the aforedescribed problem. The transformer impedance 34 which will be described in more detail below with reference to FIGS. 3 to 6 can be connected to the AC-side of the supply module 14 (FIG. 2A) or to the DC-side of the supply module 14 (FIG. 2B).

Figure 3:
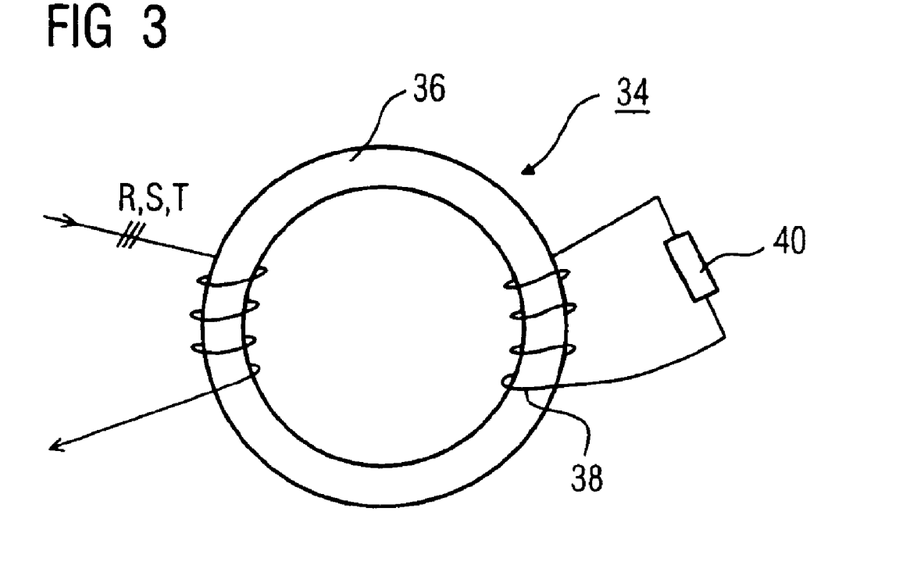
FIG. 3 shows a first embodiment of a transformer impedance according to the invention.
Figure 4:
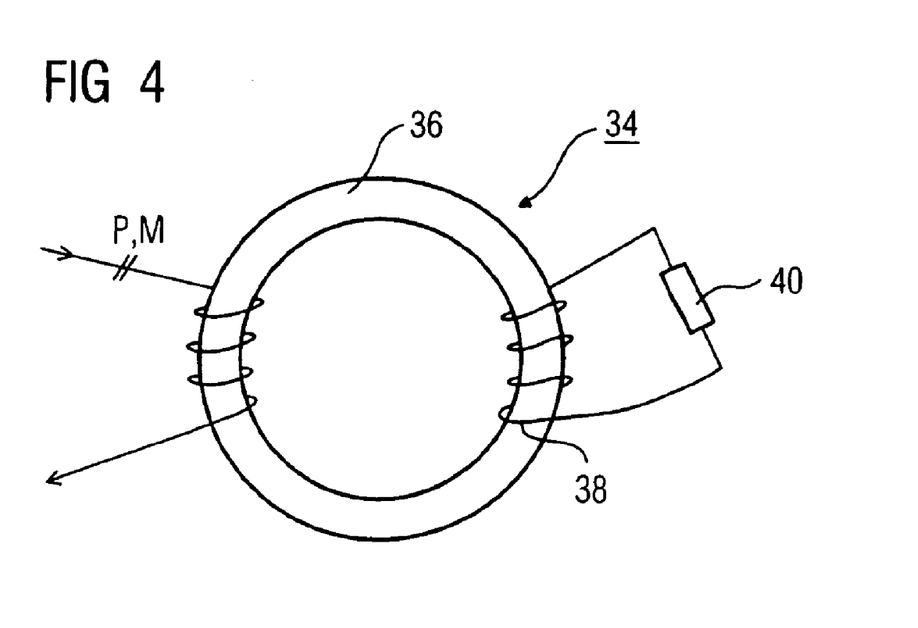
FIG. 4 shows a second embodiment of a transformer impedance according to the invention.

FIGS. 3 and 4 show embodiments of a transformer impedance 34, which includes an annular core 36 and a winding 38 which is wound in several turns on the annular core 36. An impedance 40 is electrically connected in parallel with the winding 36, thereby short-circuiting the winding 38. Also wound on the annular core 36 are several turns of the phase lines R, S and T that connect the smoothing choke 16 with the supply module 14. As a result, the impedance 40 is coupled into the phase lines R, S and T, which increases in the damping of the weakly damped oscillator circuit, with the damping depending on the impedance value. Unlike in the embodiment of FIG. 3, where the phase lines R, S and T are wound on the annular core 36, in the embodiment of FIG. 4 several turns of the output lines P and M of the supply module 14 are wound on the annular core 36. The configuration of the transformer impedance 34 is therefore independent of the connection or coupling location.

Figure 5:
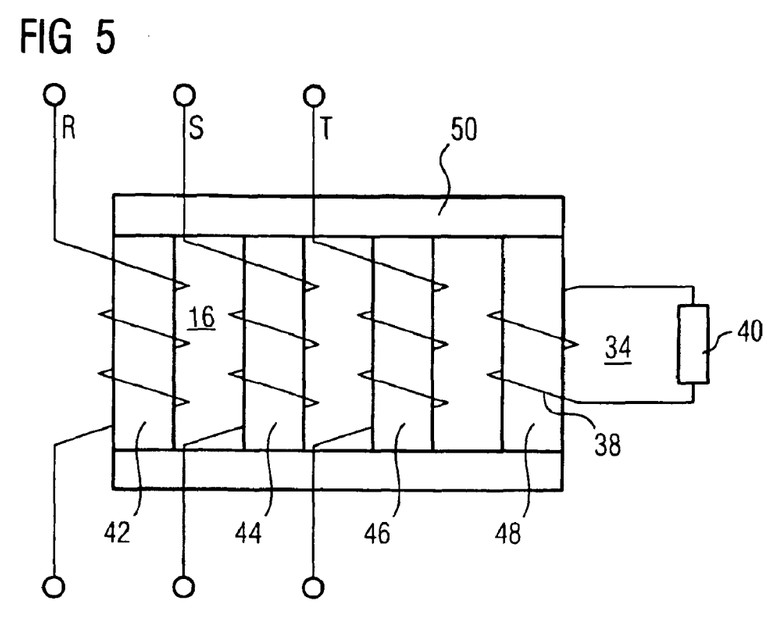
FIG. 5 shows a first embodiment of a component of the smoothing choke and the transformer impedance.

FIG. 5 shows in greater detail an advantageous embodiment of the transformer impedance 34. In this embodiment, the smoothing choke 16 and the transformer impedance 34 form an assembly. This assembly is a four-leg choke. Several turns of the three-phase lines R, S and T are wound on the legs 42, 44 and 46, while several turns of the winding 38 of the transformer impedance 34 are wound onto a fourth leg 48. To couple the impedance 40 to the phase lines R, S and T, the four legs 42, 44, 46 and 48 are magnetically connected by a yoke 50. Integration of the transformer impedance 34 in the smoothing choke 16 provides a very compact configuration.

Figure 6:
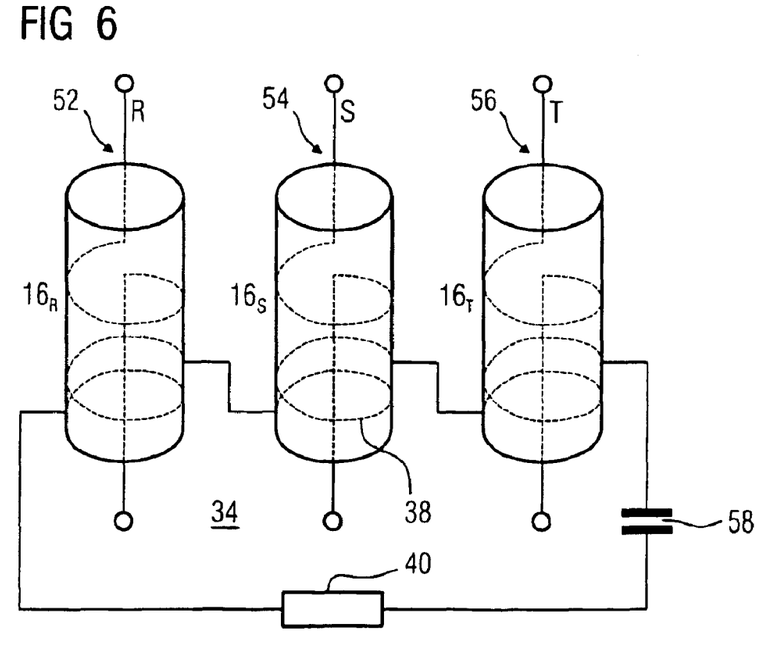
FIG. 6 shows a second embodiment of a component of the smoothing choke and the transformer impedance.

FIG. 6 shows in more detail another advantageous embodiment of the transformer impedance 34. This embodiment, unlike the embodiment of FIG. 5, does not include magnetically coupled legs 42, 44 and 46. Instead, the smoothing choke 16 in this embodiment has three individual chokes $16_R$, $16_S$ and $16_T$. In this embodiment, several turns of the phase lines R, S and T are wound onto a separate core 52, 54 and 56. The winding 38 of the transformer impedance 34 is distributed, preferably uniformly, onto the three cores 52, 54 and 56. Accordingly, a winding of a phase line R, S and T is wound on a corresponding one of the cores 52, 54 and 56 as well as a partial winding of the winding 38 of the transformer impedance 34. Subdividing the winding 38 of the transformer impedance 34 increases the degree of coupling and provides a more effective damping the undesired system oscillations by the impedance 40.

The embodiment of FIG. 6 also includes a capacitance 58 arranged in the transformer impedance 34 and connected in series with the impedance 40. As a result, only AC components can flow through the impedance 40, which compensate for magnetic asymmetries caused by parameter tolerances.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A multi-axes industrial processing machine with a multi-axes electrical drive system, comprising:
   a centrally controlled supply module having an AC side and a DC side;
   a smoothing choke connected to the AC side of the supply module;
   at least two axle drives that have each an axle module and a built-in motor, with the axle module electrically connected on the DC side of the supply module; and
   an impedance which is transformer-coupled with the supply module onto an annular core and forms a single component with the smoothing choke, whereby phase lines of the AC side of the supply module and an additional winding having each at least one turn are wound on the annular core, the impedance being connected in parallel to the additional winding.

2. The multi-axes industrial processing machine of claim 1, wherein the built-in motor is a torque motor.

3. The multi-axes industrial processing machine of claim 1, wherein the built-in motor is a linear motor.

4. The multi-axes industrial processing machine of claim 1 wherein the built-in motor is a motor spindle.

5. A multi-axes industrial processing machine with a multi-axes electrical drive system, comprising:
   a centrally controlled supply module having an AC side and a DC side;
   a smoothing choke connected to the AC side of the supply module;
   at least two axle drives that have each an axle module and a built-in motor, with the axle module electrically connected on the DC side of the supply module; and
   an impedance which is transformer-coupled with the supply module through an annular core,
   whereby output lines of the DC side of the supply module and an additional winding having each at least one turn are wound on the annular core, the impedance being connected in parallel to the additional winding.

6. The multi-axes industrial processing machine of claim 5, wherein the built-in motor is a torque motor.

7. The multi-axes industrial processing machine of claim 5, wherein the built-in motor is a linear motor.

8. The multi-axes industrial processing machine of claim 5, wherein the built-in motor is a motor spindle.

9. A multi-axes industrial processing machine, comprising:
   a supply module having an AC side and a DC side;
   a smoothing choke connected to the AC side of the supply module;
   at least two axle drives, each having an axle module and a built-in motor, with the axle module electrically connected on the DC side of the supply module; and
   a first impedance having an annular core and at least two windings wound onto the annular core, wherein a first of the at least two windings is connected to an output line on the DC side of the supply module and a second of the at least two windings is connected in parallel with a second impedance.

10. The processing machine of claim 9, wherein the built-in motor is a torque motor.

11. The processing machine of claim 9, wherein the built-in motor is a linear motor.

12. The processing machine of claim 9, wherein the built-in motor is a motor spindle.

13. A multi-axes industrial processing machine comprising:
   a supply module having an AC side and a DC side;
   a smoothing choke connected to the AC side of the supply module;
   at least two axle drives, each having an axle module and a built-in motor, with the axle module electrically connected on the DC side of the supply module; and
   a first impedance having an annular core and at least two windings wound onto the annular core.
   wherein a first of the at least two windings is connected to the supply module and a second of the at least two windings is connected in parallel with a second impedance, and
   wherein the first impedance and the smoothing choke form a unitary structure.

14. The processing machine of claim 13, wherein the built-in motor is a torque motor.

15. The processing machine of claim 13, wherein the built-in motor is a linear motor.

16. The processing machine of claim 13, wherein the built-in motor is a motor spindle.

* * * * *